United States Patent
Michael et al.

(10) Patent No.: US 6,210,490 B1
(45) Date of Patent: Apr. 3, 2001

(54) CLEANING CARD

(75) Inventors: David A. Michael; Larry W. Ditty, both of Sunbury, PA (US)

(73) Assignee: elk Technologies, Sunbury, PA (US)

(*) Notice: Subject to any disclaimer, the term of this patent is extended or adjusted under 35 U.S.C. 154(b) by 0 days.

(21) Appl. No.: 09/260,939

(22) Filed: Mar. 2, 1999

(51) Int. Cl.$^7$ ............................ B08B 1/00; A47L 25/00; B32B 3/10

(52) U.S. Cl. ............................ 134/6; 428/131; 428/134; 283/65; 283/904; 15/104.93; 15/210.1; 15/236.01; 15/236.07; 15/236.05

(58) Field of Search ............................ 15/104.94, 104.93, 15/236.01, 236.02, 236.05, 236.06, 236.07, 210.1; 428/131, 134; 283/65, 904

(56) References Cited

U.S. PATENT DOCUMENTS

| | | | |
|---|---|---|---|
| 1,211,098 | * | 1/1917 | Darrin ............................ 15/236.07 |
| 1,723,560 | * | 8/1929 | Kuroda ............................ 15/104.93 |
| 1,851,811 | * | 3/1932 | Christie . | |
| 2,606,409 | * | 8/1952 | Gordon ............................ 15/210.1 |
| 2,802,418 | * | 8/1957 | Carver ............................ 283/904 |
| 3,457,391 | * | 7/1969 | Yamamoto . | |
| 3,477,083 | * | 11/1969 | Park . | |
| 3,583,317 | * | 6/1971 | Gibson ............................ 283/904 |
| 3,754,332 | * | 8/1973 | Warren, Jr. ............................ 15/104.93 |
| 4,104,436 | | 8/1978 | Suzuki et al. . |
| 4,357,615 | * | 11/1982 | Yoshiharu ............................ 15/210.1 |
| 4,479,136 | * | 10/1984 | Lewis ............................ 15/104.94 |
| 4,505,498 | * | 3/1985 | Wienberger ............................ 283/904 |
| 4,628,388 | | 12/1986 | Kawabe . |
| 4,734,145 | | 3/1988 | Monia . |
| 5,153,964 | * | 10/1992 | Gelardi ............................ 15/210.1 |
| 5,215,334 | * | 6/1993 | Presson ............................ 283/904 |
| 5,227,226 | * | 7/1993 | Rzasa ............................ 15/104.93 |
| 5,525,417 | | 6/1996 | Eyler . |
| 5,536,328 | * | 7/1996 | Morgavi ............................ 15/210.1 |
| 5,824,611 | | 10/1998 | Eyler . |
| 5,832,556 | * | 11/1998 | Eyler ............................ 15/104.93 |
| 5,913,542 | * | 6/1999 | Belucci ............................ 283/904 |
| 5,928,758 | * | 7/1999 | Huguet ............................ 428/131 |

OTHER PUBLICATIONS

Modern Plastics Encyclopedia, 1954, p. 398, 1954.*

\* cited by examiner

*Primary Examiner*—Randall E. Chin
(74) *Attorney, Agent, or Firm*—Buchanan Ingersoll, P.C.

(57) ABSTRACT

A cleaning card for cleaning the magnetic heads of magnetic card readers is disclosed. As the card is pushed through the reader, the magnetic head protrudes through the card and then as the card continues to move the sides of the hole in the card scrub both sides of the head effectively removing dirt.

9 Claims, 5 Drawing Sheets

CLEANING CARD

BACKGROUND OF THE INVENTION

1. Field of the Invention

The invention relates to cleaning cards that clean magnetic heads of magnetic card readers.

2. Description of the Prior Art

In this information age and cashless society, the role and range of various card applications have become increasingly widespread. For example, a card which carries data of one type or another is used in credit card swipe readers, ATM terminals, facsimile and copy machines, slot machines, petroleum card readers, check readers, thermal print readers, credit vending machines, time badge readers, telephone card readers, currency counters, hotel door locks, toll gates, and mass transit to name a few. The possibilities are endless. The data carrying card is generally inserted through a slot in the processing equipment where the card may be engaged by one or more feed rollers and passed by a read, write or print head for processing data carried by the card.

For the magnetic head to read data and write data from the card, the magnetic head must make intimate contact with the magnetic media present on the card. One of the most frequent causes of misreads is dirt buildup on the magnetic head. The head picks up contaminants from the media during repeated reading operations. In the case of mass transit, dirt buildup comes from the environment, including subways and trains, as well as human oil residues present on the card itself. The residue from the card is deposited on the magnetic head. When mixed with steel dust from the rail tracks and high humidity, a gummy substance is created which builds up on the magnetic head.

One conventional method for cleaning heads, sensors and/or rollers is to use a cleaning card. The cleaning card has the approximate dimensions of the data carrying card. Typically, cleaning cards are constructed as a laminate of a semi-rigid core of acrylic, PVC, PET or ABS plastic material or the like with nonwoven fibers or a soft substantially nonabrasive material chemically bonded to both the side surfaces thereof. The cleaning card is fairly rigid and absorbent and may be presaturated with a solvent or solvent may be added just prior to the use of the cleaning card.

Several cleaning cards are currently available, however, they do not adequately clean the magnetic head or reader. For example, Monia, U.S. Pat. No. 4,734,145 discloses a card for cleaning transducer heads. The surface region of the card is visually distinguishable when it is holding a solvent as compared to when it is not. Rzasa, U.S. Pat. No. 5,227,226 discloses a cleaning card that absorbs a wide range of cleaning solvents while providing a surface texture that, in combination with the solvent, cleans feed path rollers and optical magnetic or thermal read print heads. Eyler, U.S. Pat. Nos. 5,525,417 and 5,824,611 disclose a cleaning card which has a first and second material mechanically bonded to its side surfaces. The first material is an abrasive which is substantially impenetrable and the second material is soft, highly absorbent fabric.

None of these currently available cleaning cards adequately clean a magnetic head or reader. They only clean the one side of the head that comes into contact with the edge of the card when it is swiped through the magnetic reader.

Another conventional method of cleaning magnetic card readers is to remove the contaminants by wiping the surface of the heads and rollers with a soft paper or rag impregnated with a cleaning solvent. In this case, however, it is necessary to disassemble the equipment for exposing the rollers and heads. The low usage equipment recommended cleaning schedule is one time per week. For high usage it is daily. Therefore, this method is labor intensive and hence, impractical.

Accordingly, there has been a need for a cleaning card which is effective in removing stubborn contaminants and for making the daily cleaning process faster, thus keeping the equipment running efficiently and with little interruption.

SUMMARY OF THE INVENTION

I provide a cleaning card that cleans magnetic heads of credit card readers. The card is sized so that the card can be pushed through a reader. The card has at least one hole which is positioned on the card and is sized and configured so that a magnetic head can protrude through the hole as the card is being pushed through the reader. The card is substantially rigid, absorbent and presaturated with a solvent. I also provide a method of cleaning the magnetic heads of magnetic card readers. They can be cleaned by cutting at least one hole in a cleaning card and pushing the card through a card reader.

DETAILED DESCRIPTION OF THE PREFERRED EMBODIMENT

Figure 1:
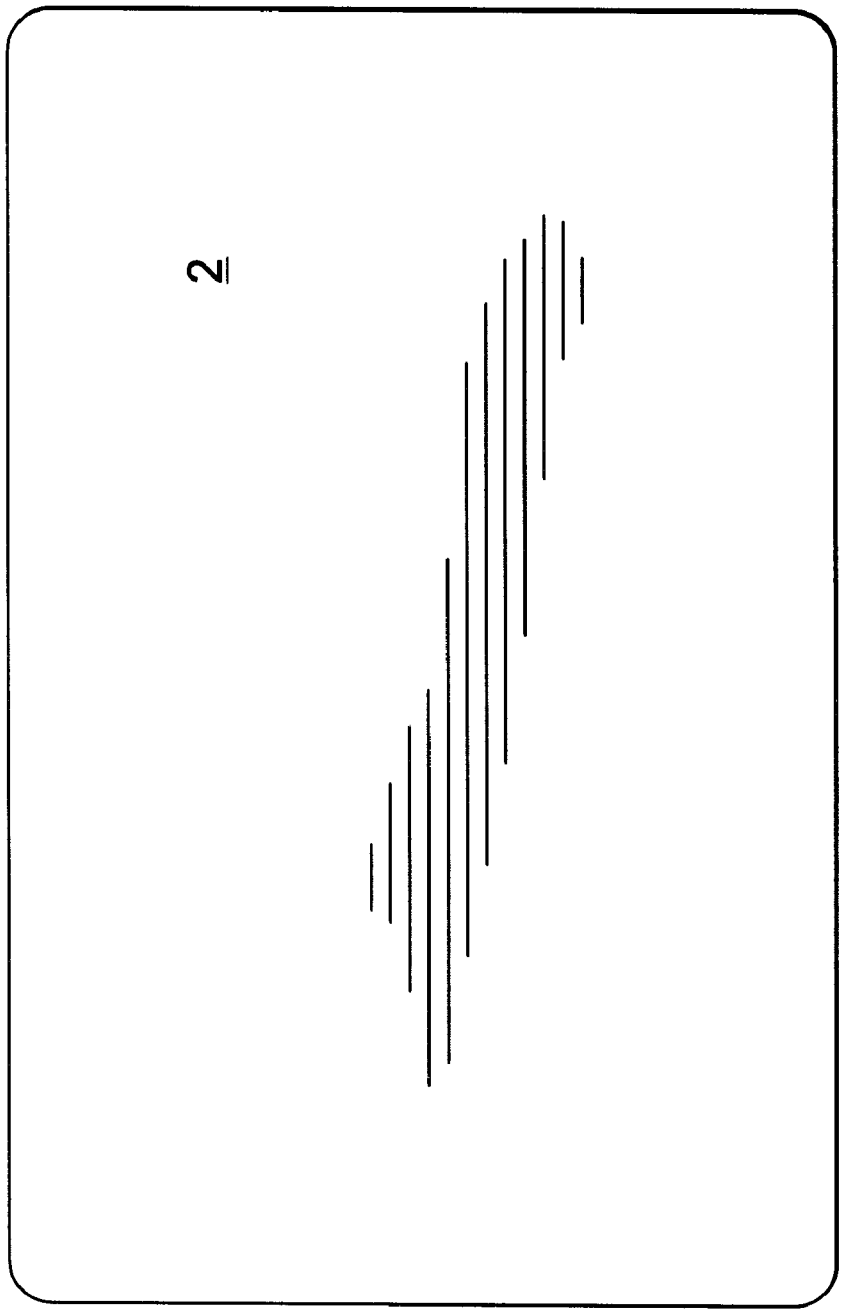
FIG. 1 is a front view of a prior art cleaning card.
Figure 2:
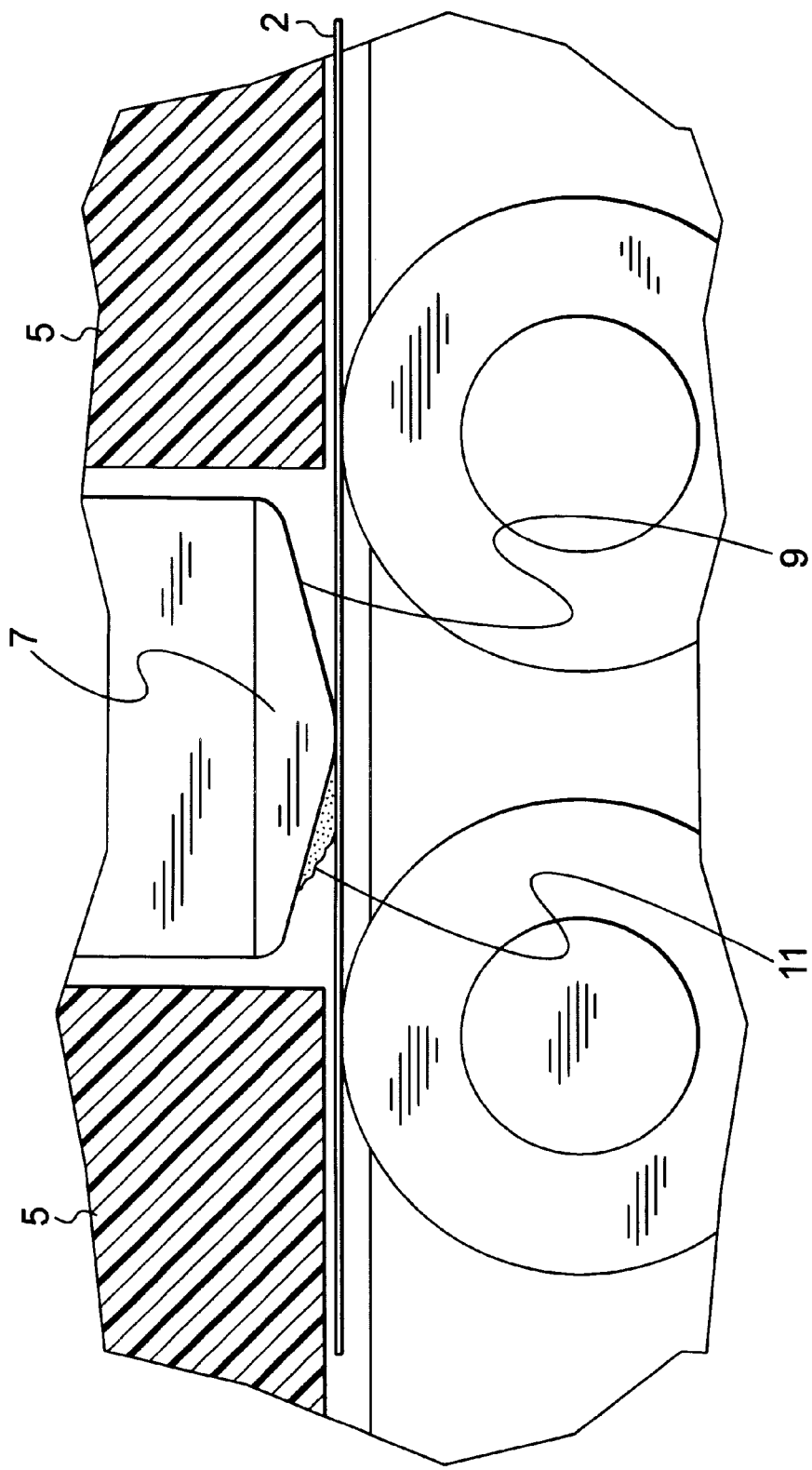
FIG. 2 is a top view of a prior art cleaning card cleaning a magnetic card reader partially in section.

The standard prior art cleaning card 2, shown in FIG. 1, is credit card sized. It is used to clean magnetic card reader heads 7 by pushing the card through a magnetic reader 5, as can be seen in FIG. 2. However, only one side 9 of the magnetic head 7 is adequately cleaned. The front edge of the card simply pushes dirt 11 from one side of the head to the other.

Figure 3:
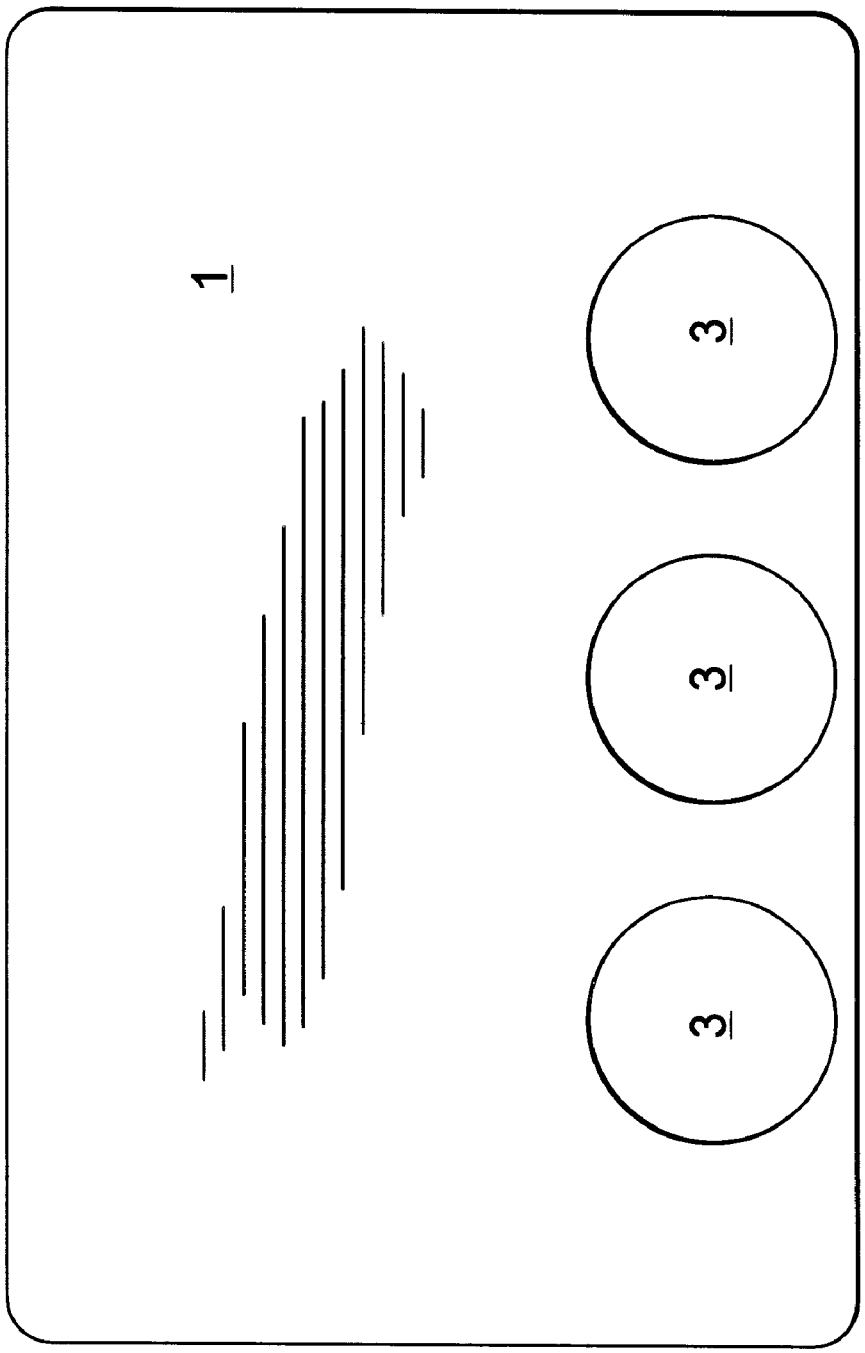
FIG. 3 is the front view of the preferred embodiment of our cleaning card.

The preferred embodiment, in FIG. 3, includes cleaning card 1 having three holes 3. The cleaning card 1 is approximately the same size as a credit card. It is preferably 3.38 inches across and 2.13 inches high. It is preferably made from standard 0.015 inch or 0.30 inch thick head cleaning card material. The card 1 is fairly rigid and absorbent and presaturated with a solvent. The three holes 3 shown are circular and have a diameter of 0.63 inches. The center of the holes are 0.38 inches from the edge of the card 1 and 0.83 inches apart. However, the holes 3 may be of any shape as long as the magnetic head 7 can protrude through the holes 3 enough for the sides 9 of the head 7 to be scubbed. It is easier to construct the cards with circular holes as the holes can be punched with standard "off the shelf" tooling. However, moon-shaped, angled slot, triangular, etc., holes could also be as effective or more effective than circular holes.

Figure 4:
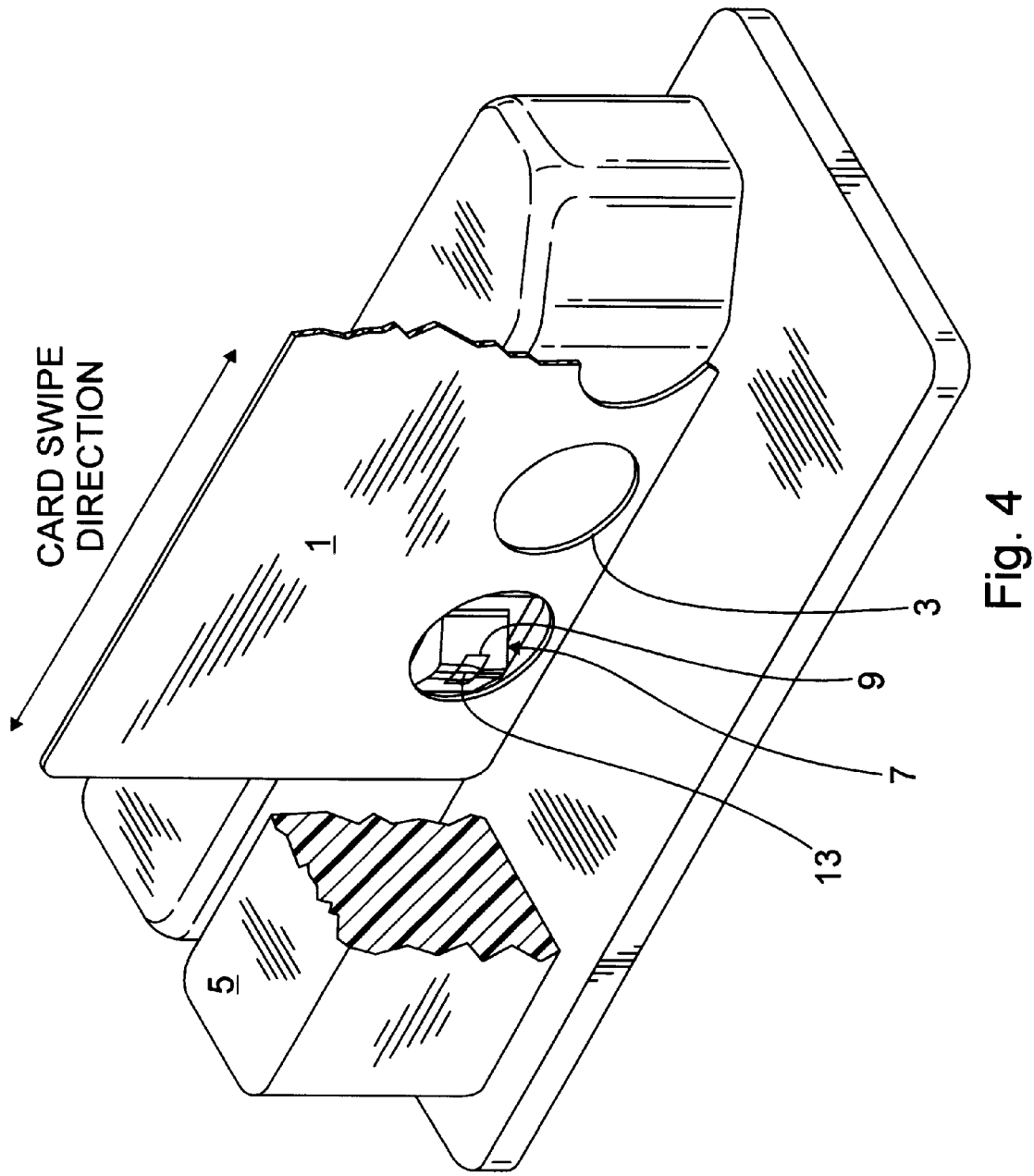
FIG. 4 is a perspective view of our cleaning card cleaning a magnetic card reader with a portion of the reader cut away.
Figure 5:
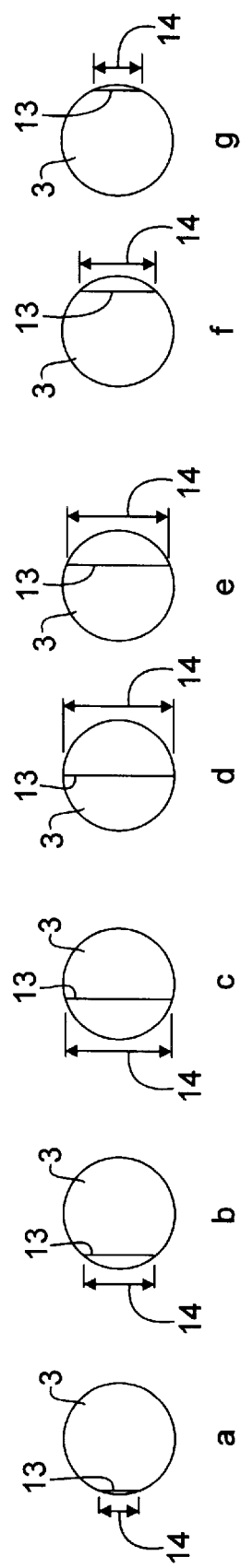
FIGS. 5a–5g is the front view of a hole in our cleaning card as the hole is moving over the head gap.

To use the cleaning card 1 to clean the magnetic heads 7 of a magnetic card reader 5, the card 1 is simply swiped through the reader as shown in FIG. 4. The holes 3 in the cleaning card 1 allow the magnetic head 7 to partially protrude through the card 1. As the card 1 is pushed through the reader 5, the magnetic head 7 protrudes through the holes 3 in the card 1 and as the card 1 continues to move, the sides of the holes 3 provide a scrubbing action to the sides 9 of the head 7 effectively removing the dirt.

One of the major reasons for the design is to increase the number of leading and trailing edges which mechanically loosen dirt and scrub the head surface. The circular design provides up and down action across the gap 13 of the head 7 by changing the point of contact of the edge of the hole 3 and the gap line 14 of the head 7. As shown in FIGS. 5a–5g, the gap line 14, which is that portion of the gap 13 protruding through the hole 3, changes in length as the card 1 is swiped over the head 7. The gap 13 is the part of the head 7 that actually reads the information on the card 1. The up and down action across the gap 13 of the head 7 occurs as the card 1 is swiped over the head 7 and is illustrated in FIGS. 5a–5g.

Although I have shown a present preferred embodiment of our cleaning card, it should be distinctly understood that the invention is not limited thereto but may be variously embodied within the scope of the following claims.

What is claimed is:

1. A method of cleaning a magnetic head of a magnetic card reader comprising the steps of:

providing a card sized so that the card can be pushed through a magnetic card reader, the card including at least one hole positioned on the card and sized so that a magnetic head can partially protrude through the at least one hole as the card is being pushed through the magnetic card reader, wherein side edges of the at least one hole slidingly contact and clean the magnetic head; and pushing the provided card through the magnetic card reader.

2. The method of claim 1, wherein the at least one hole is substantially circular.

3. The method of claim 2, wherein the provided card is substantially rigid.

4. The method of claim 3, wherein the provided card is substantially absorbent.

5. The method of claim 4, wherein the provided card is substantially presaturated with a solvent.

6. The method of claim 5, wherein the provided card is substantially credit card sized.

7. The method of claim 6, wherein the provided card has three holes.

8. A method of cleaning a magnetic head of a magnetic card reader configured to receive magnetic cards of select dimensions, said method comprising the steps of:

providing a cleaning device comprising a cleaning card receivable in the magnetic card reader and having dimensions approximately equal to the select dimensions, the cleaning card including at least one hole formed therein positioned and sized as that the magnetic head partially protrudes through the at least one hole as the cleaning card is received in the magnetic card reader such that side edges of the at least one hole slidingly contact and clean the magnetic head; and pushing the provided cleaning card through the magnetic card reader.

9. The method of claim 8, wherein the magnetic head includes a gap for reading information on the magnetic cards and side surfaces tapering from the gap in opposite lateral directions, and wherein the side edges of the at least one hole slidingly contact and clean the gap and both side surfaces of the magnetic head as the cleaning card is received in the magnetic card reader.

* * * * *